(12) United States Patent
Daly (10) Patent No.: US 10,451,098 B2
(45) Date of Patent: Oct. 22, 2019

(54) TOGGLE FIXING

(71) Applicant: fischerwerke GmbH & Co. KG, Waldachtal (DE)

(72) Inventor: Aaron Daly, Pfalzgrafenweiler (DE)

(73) Assignee: fischerwerke GmbH & Co. KG, Waldachtal (DE)

( * ) Notice: Subject to any disclaimer, the term of this patent is extended or adjusted under 35 U.S.C. 154(b) by 158 days.

(21) Appl. No.: 15/561,047

(22) PCT Filed: Mar. 19, 2016

(86) PCT No.: PCT/EP2016/000487
§ 371 (c)(1),
(2) Date: Sep. 23, 2017

(87) PCT Pub. No.: WO2016/165807
PCT Pub. Date: Oct. 20, 2016

(65) Prior Publication Data
US 2018/0073538 A1    Mar. 15, 2018

(30) Foreign Application Priority Data

Apr. 15, 2015 (DE) .......................... 10 2015 105 778
Sep. 29, 2015 (DE) .......................... 10 2015 116 421

(51) Int. Cl.
*F16B 13/08*    (2006.01)

(52) U.S. Cl.
CPC .......... *F16B 13/0808* (2013.01); *F16B 13/08* (2013.01)

(58) Field of Classification Search
CPC .................................................. F16B 13/0808
(Continued)

(56) References Cited

U.S. PATENT DOCUMENTS 867,799 A * 10/1907 Cook .................. F16B 13/0808
411/346
918,063 A    4/1909 Klahre
(Continued)

FOREIGN PATENT DOCUMENTS

DE    1 121 792 B    1/1962

OTHER PUBLICATIONS

International Search Report and Written Opinion for corresponding International Application No. PCT/EP2016/000487 dated May 25, 2016.
(Continued)

*Primary Examiner* — Roberta S Delisle
(74) *Attorney, Agent, or Firm* — Renner, Otto, Boisselle & Sklar, LLP (57) ABSTRACT

A toggle fixing for fixing an article to a thin-walled building component. The toggle fixing includes a crosspiece and a strip which is connected to the crosspiece and serves for holding the crosspiece during mounting. An opening for receiving a screw is formed centrally on the crosspiece, the opening extending along an opening longitudinal axis (LÖ). In order that screws of which the external diameter (DA) is smaller than the internal diameter (DK) of the opening can also be fixed to the crosspiece it is proposed that there be arranged on the crosspiece at least one counterbearing element having a spacing (AW) from the opening longitudinal axis (LÖ) that is less than half the internal diameter (DK) of the opening.

15 Claims, 5 Drawing Sheets

(58) Field of Classification Search
USPC .................................. 411/340, 344–345, 346
See application file for complete search history.

(56) References Cited

U.S. PATENT DOCUMENTS

| | | | | |
|---|---|---|---|---|
| 1,073,998 A * | 9/1913 | Lundin | ............... | F16B 13/0808 411/342 |
| 2,096,387 A * | 10/1937 | Tinnerman | ............ | B21D 39/03 24/458 |
| 2,378,957 A * | 6/1945 | Tinnerman | ............ | F16B 5/0208 411/437 |
| 2,401,202 A * | 5/1946 | Tinnerman | ............ | F16B 37/065 411/429 |
| 2,401,672 A * | 6/1946 | Tinnerman | ............ | F16B 5/0208 411/437 |
| 3,211,042 A * | 10/1965 | Fischer | ............... | F16B 13/0808 411/344 |
| 3,382,753 A * | 5/1968 | Tinnerman | ............ | F16B 21/16 411/437 |
| 3,605,547 A * | 9/1971 | Millet | ................ | F16B 13/0808 29/432 |
| 3,927,597 A * | 12/1975 | Stults | .................. | F16B 13/0808 411/341 |
| 3,946,636 A * | 3/1976 | Grey | .................... | F16B 13/0808 411/346 |
| 4,283,986 A * | 8/1981 | Peterson | ............. | F16B 13/0808 411/340 |
| 4,318,651 A | 3/1982 | Ragen | | |
| 4,406,569 A | 9/1983 | Askew | | |
| 4,997,327 A * | 3/1991 | Cira | .................... | F16B 13/0808 411/340 |
| 5,716,179 A | 2/1998 | Smith | | |
| 6,318,941 B1 * | 11/2001 | Guenther | ............. | F16B 13/0808 411/342 |
| 6,821,069 B2 * | 11/2004 | Ikuta | .................. | F16B 13/0808 411/340 |

OTHER PUBLICATIONS

German Search Report for corresponding German application DE 10 2015 105 779.4 dated Jan. 19, 2016.
International Preliminary Report on Patentability corresponding to International Application No. PCT/EP2016/000487 dated Oct. 26, 2017.

* cited by examiner

TOGGLE FIXING

TECHNICAL FIELD OF INVENTION

The invention relates to a toggle fixing having the features described herein.

DISCUSSION OF RELATED ART

Patent specification DE 1 121 792 discloses a toggle fixing for fixing an article, for example a lamp, to a thin-walled building component. The building component is, for example, a plasterboard panel. The toggle fixing has a crosspiece through which a threaded bore extends transversely. In addition, an integrally formed strip projects laterally in the region of the threaded bore. Once a hole has been drilled in the thin-walled building component, the toggle fixing is pushed, one end first, through the drilled hole, the strip being bent to the side in such a way that it rests laterally against the crosspiece. As soon as the crosspiece has passed fully through the drilled hole, it can be tilted in the cavity located behind the building component so that a supporting side of the crosspiece comes into contact with the rear side of the building component. The tilting movement is effected by pulling the strip. At the same time, it is ensured that the threaded bore is in alignment with the hole, so that a screw can be screwed into the threaded bore. Such a screw can be used to fix the article to the visible side of the building component facing towards the user. A disadvantage of the known toggle fixing is that the threaded bore is designed only for screws having a specific external diameter and a specific thread form. If a screw differs from the intended form of screw, then either, in the case of too small a diameter, it has no purchase in the threaded bore or, in the case of too large a diameter, the crosspiece turns with the screw when the latter is being screwed in, so that the screw cannot be fully screwed into the threaded bore.

The problem of the invention is therefore to provide a generic toggle fixing which can be used with screws of an extremely wide variety of diameters and thread forms.

SUMMARY OF THE INVENTION

That problem is solved according to the invention described herein. The toggle fixing according to the invention for fixing an article to a thin-walled building component behind which there is a cavity has a crosspiece and a strip which is connected to the crosspiece. The strip serves for holding the crosspiece during mounting. The connection between the crosspiece and the strip can be in the form of a pivot bearing, so that the strip can be pivoted relative to the crosspiece. A clip connection, for example, is also possible however. In particular, the connection is integral, so that the strip can be manufactured together with the crosspiece or with parts of the crosspiece. On the side facing towards the strip the crosspiece forms a supporting side for contact with the thin-walled building component. The crosspiece extends along a crosspiece longitudinal axis. "Crosspiece" denotes especially a component the dimensions of which transverse with respect to the crosspiece longitudinal axis are smaller than in the direction of the crosspiece longitudinal axis. A circle circumscribing the crosspiece, the centre point of which circle lies on the crosspiece longitudinal axis and the radius of which is normal with respect to the crosspiece longitudinal axis, accordingly has a diameter that is smaller than or equal to the diameter of a drilled hole in the thin-walled building component through which the crosspiece is introduced in order to fix an article to the thin-walled building component using the toggle fixing. The extent of the crosspiece in the direction of the crosspiece longitudinal axis is greater than the diameter of the drilled hole, so that the crosspiece, after tilting in the cavity, is no longer able to move out of the drilled hole when its supporting side rests against the rear side of the building component. The crosspiece has an opening for receiving a screw. The opening extends along an opening longitudinal axis transverse with respect to the crosspiece longitudinal axis, "transverse" here meaning that the opening longitudinal axis and the crosspiece longitudinal axis are not parallel or identical. In particular, the two longitudinal axes are substantially orthogonal to one another; in particular they may intersect. In the opening there can be arranged an internal thread which is preferably implemented as a standard metric thread in accordance with DIN 202 (1999-11) or as a standard inch thread (UNC) in accordance with the "Unified Thread Standard", so that hexagonal screws having a standard thread, which are often used for toggle fixings, can be screwed into the internal thread.

According to the invention there is arranged on the crosspiece at least one counterbearing element having a spacing from the opening longitudinal axis that is less than half the internal diameter of the opening. "Internal diameter" means the diameter of a circular cylinder inscribed in the opening, the axis of which lies on the opening longitudinal axis. The "spacing" refers here to the shortest distance between a free end of the counterbearing element and the opening longitudinal axis. In other words, it means that the free end of the counterbearing element on projection of the counterbearing element in a radial plane of the opening longitudinal axis projects into a projection of the free cross-section of the opening. Once the counterbearing element is arranged in the opening, the free end of the counterbearing element projects into the opening and thus reduces the free cross-section of the opening locally. The screw inserted into the opening engages with its thread behind the counterbearing element, so that the screw is held in the opening. The opening can be provided with an internal thread, the thread of which is complementary to an external thread of a screw preferred for the toggle fixing. In that case the core diameter of the internal thread corresponds to the internal diameter of the opening. If the external diameter of a screw is smaller than that of the preferred screw, it will not find sufficient purchase in the internal thread but will find purchase on the counterbearing element. With the aid of the counterbearing element, screws having a diameter smaller than the internal diameter of the opening or smaller than the core diameter of the internal thread can be held in the opening of the toggle fixing. In addition, it is possible to use screws the pitch of which does not correspond to the pitch of the internal thread or the thread form of which differs from that of the internal thread.

In order that the counterbearing element is able to engage behind the thread of a screw, the height of the counterbearing element, at least in the region of its free end, in the direction of the opening longitudinal axis is less than the length of the opening. In particular, the height of the counterbearing element is a maximum of 20% of the length of the opening. In particular, the height of the counterbearing element is smaller than the axial spacing between two adjacent thread flanks of a preferred screw which, together with the toggle fixing, forms a fixing unit. In particular, the height is less than 2.5 millimeters, especially smaller than 2.0 millimeters. If an internal thread is provided in the opening, the internal thread can be implemented as a standard metric or inch thread and the counterbearing element can be designed for engagement behind the thread flanks of wood screws and/or chipboard screws, which usually have a larger pitch, a greater thread depth and a smaller flank angle than a screw having a standard thread.

Preferably the spacing of the counterbearing element from the opening longitudinal axis is at least 1.0 millimeter, especially at least 1.5 millimeters, especially at least 2.0 millimeters, smaller than half the internal diameter of the opening. In particular, the spacing is less than half the internal diameter of the opening. The free end of the counterbearing element can also project beyond the opening longitudinal axis and intersect therewith. Accordingly, screws of extremely different diameters can be introduced into the opening and held in the opening by means of the counterbearing element.

In order that a screw can be screwed through the opening even when it has a core diameter that is larger than the spacing of the counterbearing element together with half the diameter of the opening, the counterbearing element is formed in such a way that, on insertion of a screw into the opening, it can be moved away from the opening longitudinal axis. In that case the counterbearing element of the screw yields radially and in the direction in which the screw is introduced into the opening. The counterbearing element accordingly makes room for the screw, so that the screw is able to pass through the opening. For that purpose the counterbearing element is preferably in the form of a cantilever arm, the free end of which is directed away from the supporting side of the crosspiece. In particular, the free end is of planar construction, it being possible for the surface to have a chamfer in order to facilitate engagement in the thread of a screw. The free end accordingly has an end edge which runs transversely with respect to the crosspiece longitudinal axis, but substantially in a radial plane of the opening longitudinal axis. "Transversely" means here especially that a straight line running normally with respect to the end edge encloses with the crosspiece longitudinal axis an angle of from 0° to 15°, especially an angle of from 5° to 10°. "Substantially in a radial plane of the opening longitudinal axis" means here an inclination relative to the opening longitudinal axis of less than 15°, especially less than 10°.

The counterbearing element preferably has a bearing region by means of which the counterbearing element is mounted, especially rigidly mounted, on and/or in the crosspiece. In addition, the counterbearing element has an engagement region which is bent at an angle relative to the bearing region. Accordingly, the bearing region can readily be matched to the shape of the crosspiece, while the angled engagement region serves for interaction with the screw. In particular, for engagement in the thread of the screw a thread element is provided on the side of the engagement region that faces towards the supporting side of the crosspiece.

The counterbearing element is preferably of plate-like construction and is mounted in a receptacle of the crosspiece. "Plate-like" means that the thickness of the counterbearing element is significantly less than the width and the length of the counterbearing element. In particular, the thickness is smaller by the factor 5 to 10. In particular, the counterbearing element has a thickness that is smaller than 2.0 millimeters, especially smaller than 1.5 millimeters, and especially smaller than 1.2 millimeters. The receptacle is especially configured in such a way that the counterbearing element is rigidly connected to the crosspiece.

Furthermore, it is preferable for the bearing region to have two bearing limbs which are separated from one another by a slot, the slot preferably being U-shaped. In particular, the width of the slot corresponds to at least the width of a bearing limb. The slot can be oriented in the direction of the crosspiece longitudinal axis or transversely thereto, especially orthogonally with respect to the crosspiece longitudinal axis. As a result of the U-shaped configuration, the bearing surface of the bearing limbs is rounded and is enlarged in the region of the slot, so that compressive forces acting in the plate plane of a plate-like counterbearing element can be introduced into the crosspiece over a large surface area.

In a preferred embodiment, the crosspiece has a receptacle having two receiving openings for receiving the bearing limbs, the receiving openings being separated from one another by a reinforcing rib. The reinforcing rib reinforces the wall of the receptacle so that the wall does not bend, or bends only very slightly, even when the counterbearing element is subjected to a bending moment by the screw.

Preferably the counterbearing element is made of metal which, on account of its resilience and strength, can be of relatively thin construction, so that it can be bent without a large amount of force when a screw is passed through the opening, but nevertheless holds the screw with sufficient resistance. In addition, the crosspiece is made of plastics material, so that it is economical to produce in an injection-moulding process.

BRIEF DESCRIPTION OF THE DRAWINGS

The invention is explained in greater detail below with reference to two exemplary embodiments shown in the drawing, wherein FIG. 1 is a side view of a first toggle fixing according to the invention with a chipboard screw screwed in;

DETAILED DESCRIPTION OF THE INVENTION

Figure 5:
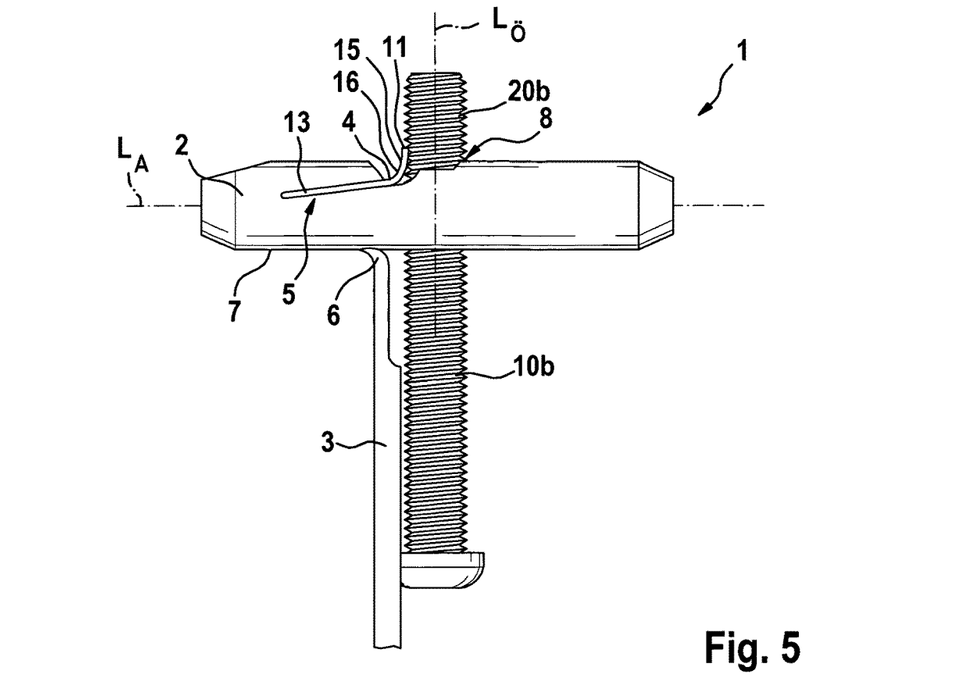
FIG. 5 is a side view of the first toggle fixing according to the invention with a screw having a standard metric thread.
Figure 6:
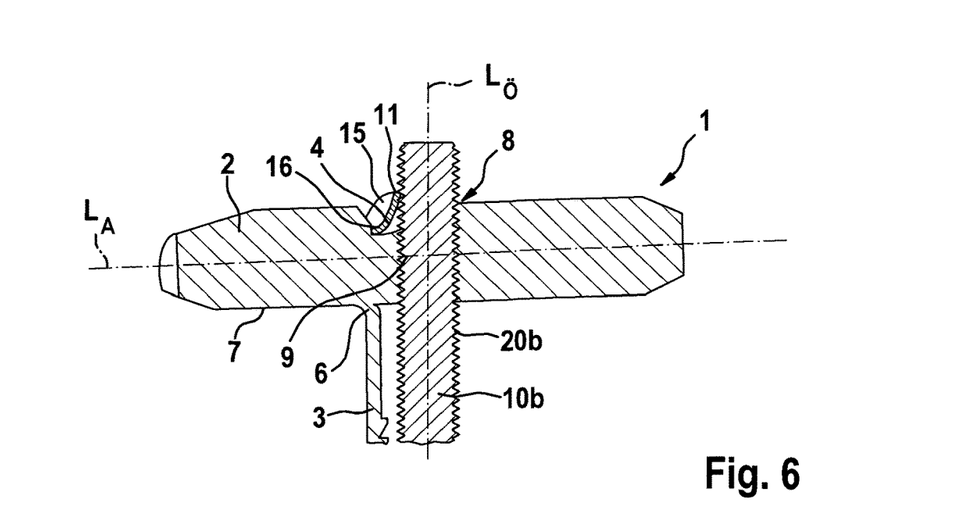
FIG. 6 shows an axial section through the first toggle fixing according to the invention with a screw having a standard metric thread.
Figure 7:
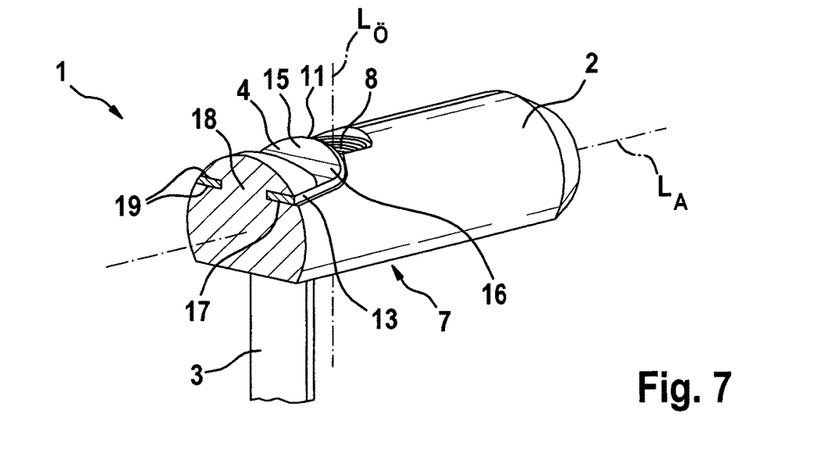
FIG. 7 shows a section along line VII-VII of FIG. 1.

FIGS. 1 to 7 show a first toggle fixing 1 according to the invention with which an article can be fixed to a thin-walled building component, for example a plasterboard panel, behind which there is a cavity. The article and the building component are not shown in the drawing. The toggle fixing 1 consists of a crosspiece 2, a strip 3 and a counterbearing element 4 which is mounted clamped in a receptacle 5 of the crosspiece 2. The strip 3 is elongate and produced from plastics material in one piece with the crosspiece 2. In the region of the connection 6 between the strip 3 and the crosspiece 2 the strip 3 is rounded and reduced in cross-section, so that it is able to rotate relative to the crosspiece 2 by bending resiliently. The strip 3 serves for holding and for positioning the crosspiece 2 during mounting of the toggle fixing 1 on the building component. The crosspiece 2 extends along a crosspiece longitudinal axis $L_A$ over its length $L_B$, while the height $H_B$ (FIG. 1) and the width $B_B$ (FIG. 4) of the crosspiece 2 extend radially with respect to the crosspiece longitudinal axis $L_A$ and are smaller than the length $L_B$. The length $L_B$ of the crosspiece 2 is substantially four times as great as the height $H_B$ or the width $B_B$, which are substantially of equal size. Facing towards the strip 3 the crosspiece 2 has a flat supporting side 7 for contact with the side of the building component facing towards the cavity. Arranged centrally on the crosspiece 2 in relation to its length $L_B$ and its width $B_B$ there is an opening 8 in the form of a threaded bore which passes through the crosspiece 2 over its entire height $H_B$, which opening has an internal thread 9 implemented as a standard metric thread. The opening 8 serves for receiving a screw 10a, 10b and extends along an opening longitudinal axis $L_Ö$ which runs at an angle of 90° transversely with respect to the crosspiece longitudinal axis $L_B$ and normally with respect to a plane parallel to the flat supporting side 7. A screw 10b having a standard metric thread can be screwed into the internal thread 9, the diameter of which screw is complementary to that of the internal thread 9. This is shown in FIGS. 5 and 6.

Figure 8:
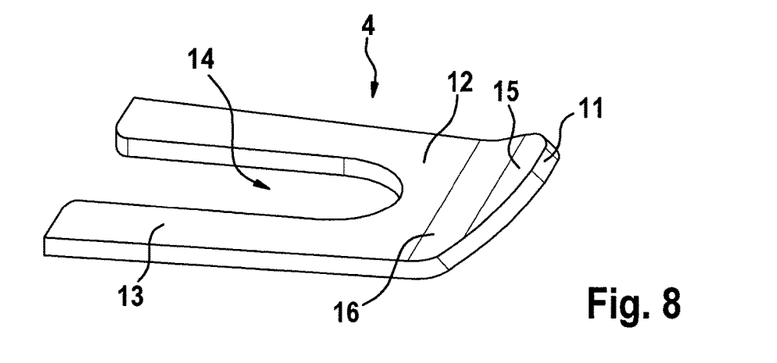
FIG. 8 is a perspective view of a counterbearing element.

In order that a screw 10a having an external diameter $D_A$ that is smaller or only negligibly larger than the core diameter $D_K$ of the internal thread 9 can also be held in the opening 8, a spacing $A_W$ of the free end 11 of the counterbearing element 4 from the opening longitudinal axis $L_Ö$ is less than half the internal diameter $D_K$ of the opening 8, the internal diameter $D_K$ being equal to the core diameter of the internal thread 9. Half the core diameter is accordingly equal to the radius re of the free cross-section of the opening 8 (see FIGS. 3 and 4). In the case of the toggle fixing shown, the spacing $A_W$ is 0.25 millimeter at an internal diameter $D_K$ of 4.5 millimeters and is accordingly 2 millimeters less than half the internal diameter $D_K$ of the opening 8. The counterbearing element 4, which is made from a thin, 0.8 millimeter thick steel sheet, is shown in FIG. 8. The counterbearing element 4 is of plate-like construction and has a bearing region 12 having two bearing limbs 13 which are separated from one another by a U-shaped slot 14. The bearing region 12 is adjoined by an engagement region 15 which, on account of its being bent at a bending point 16, is bent at an angle of 45° relative to the bearing region 12, with the result that the height $H_W$ of the counterbearing element 4 in the region of the opening 8, measured in the direction of the opening longitudinal axis $L_Ö$, is approximately 1.2 millimeters. The engagement region 15 tapers on the side facing away from the bending point 16 and ends in the free end 11. Once the counterbearing element 4 is installed in the receptacle 5, it forms a cantilever arm the free end 11 of which, as a result of its being bent at an angle, is directed away from the supporting side 7 of the crosspiece 2, which makes it easier for a screw 10a, 10b to be inserted into the opening 8 and held therein. The receptacle 5 has two groove-like receiving openings 17 (see FIG. 7) in which the bearing limbs 13 are mounted in surface contact and substantially without play, so that the counterbearing element 4 is held firmly clamped in the receptacle 5. The two receiving openings 17 are separated from one another by a reinforcing rib 18 which fills the slot 14 and connects the walls 19 with which the bearing limbs 13 are in surface contact. The reinforcing rib 18 prevents the walls 19 from moving away from one another and the receptacle 5 from being widened when a bending moment acts on the counterbearing element 4.

Figure 1:
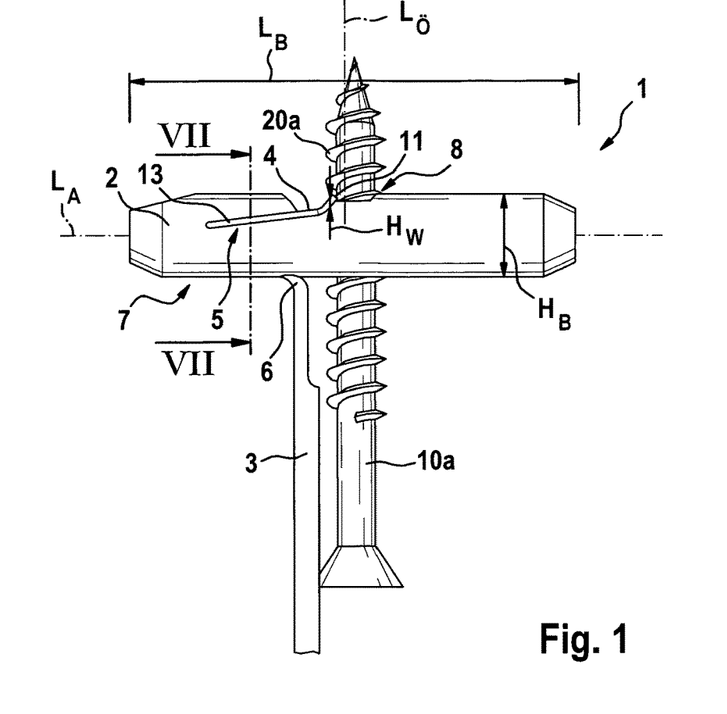
Figure 2:
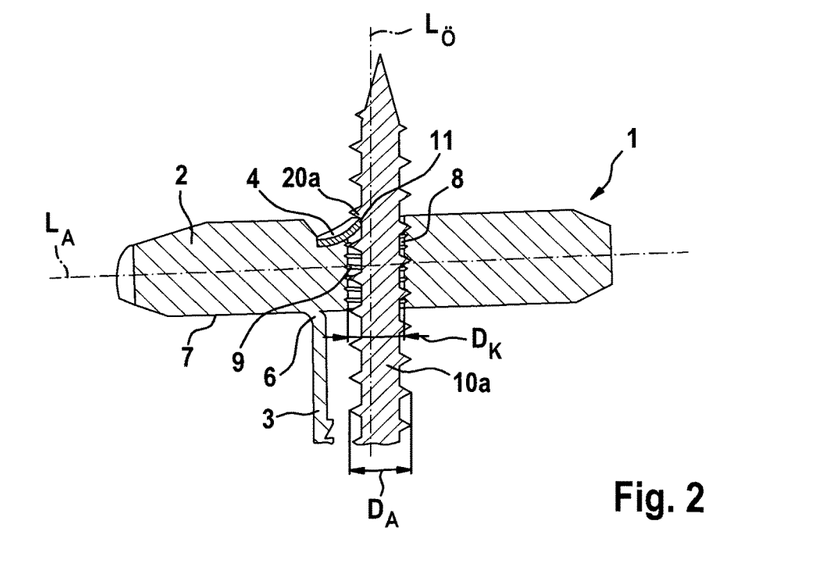
FIG. 2 shows an axial section through the first toggle fixing according to the invention in accordance with FIG. 1.
Figure 3:
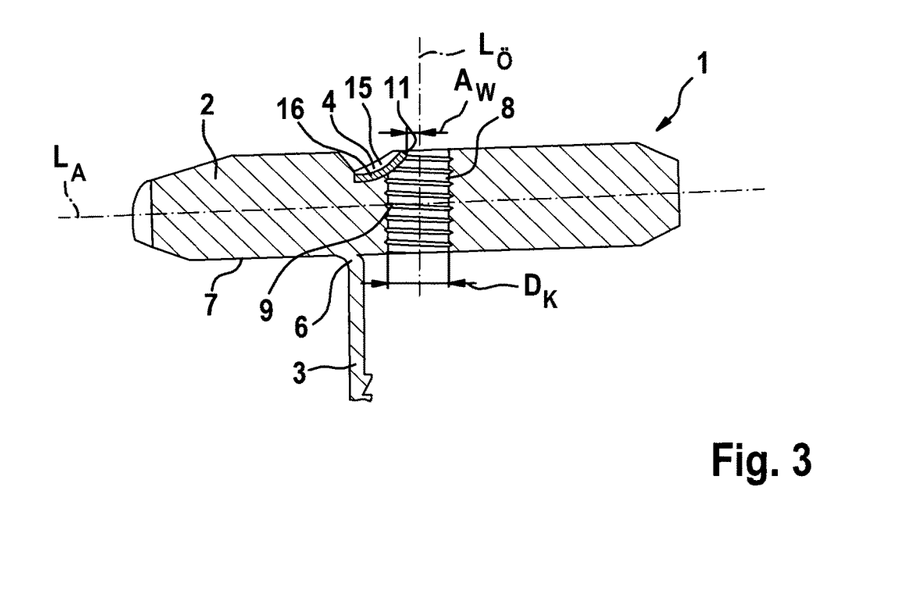
FIG. 3 shows an axial section through the first toggle fixing according to the invention without a screw.
Figure 4:
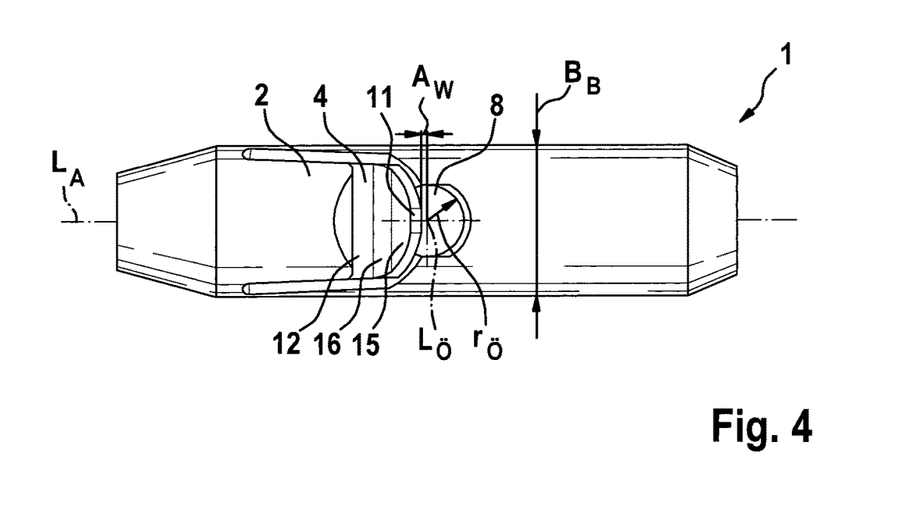
FIG. 4 is a plan view of the first toggle fixing according to the invention without a screw.

If a screw 10a having an external diameter $D_A$ that is smaller than the internal diameter $D_K$ is introduced into the opening 8, as shown in FIGS. 1 and 2 with the aid of a screw 10a—a chipboard screw having an external thread 20a with an external diameter $D_A$ of 4 mm—then the external thread 20a, on account of the external diameter $D_A$ being too small, cannot engage in the internal thread 9, the thread form of which, in addition, differs from that of the external thread 20a. The screw 10a can therefore be pushed into the opening 8 until it strikes the counterbearing element 4 by which it is pressed against the wall of the opening 8 located opposite the free end 11 of the counterbearing element 4. The screw 10a then lies eccentrically in the opening 8 and can be screwed further into the opening 8 by rotation, in the course of which the free end 11 of the counterbearing element 4 engages behind the external thread 20a, so that the screw 10a is held in the opening 8. The external thread 20a can, in addition, cut into the wall of the opening 8 located opposite the counterbearing element 4, with the result that the purchase of the screw 10a in the opening 8 is improved. When an article is fixed to a building component with the toggle fixing 1 and the screw 10a, a tensile force acts in the screw 10a, which tensile force acts on the free end 11 of the counterbearing element 4 and pulls the counterbearing element 4 in the direction of the supporting side 7, in the course of which there is transmitted to the counterbearing element 4 a compressive force and a bending moment which is introduced into the crosspiece 2 by means of the receptacle 5 and transmitted as a compressive force to the building component via the supporting side 7. Accordingly the article is clamped against the building component with the toggle fixing 1 and the screw 10a.

The article can, however, also be fixed to a building component by means of the toggle fixing 1 with a screw 10b having a standard metric thread that fits the internal thread 9, as shown in FIGS. 5 and 6. For that purpose, the screw 10b is screwed into the internal thread 9. The counterbearing element 4 is moved away from the supporting side 7 and the opening longitudinal axis $L_Ö$ when the screw 10b strikes the engagement region 15 of the counterbearing element 4. The bearing region 12 is weakened by the slot 14 so that the portion of the counterbearing element 4 projecting from the receptacle 5 is movable accordingly, the spacing $A_W$ between the free end 11 of the counterbearing element 4 and the opening longitudinal axis $L_Ö$ being enlarged, with the result that a free passage is formed through which the screw 10b can be screwed. The free end 11 can enter into engagement with the metric external thread 20b of the screw 10b, but this is not absolutely necessary. The screw 10b is already held securely in the internal thread 9 which is complementary to the external thread 20b.

Figure 9:
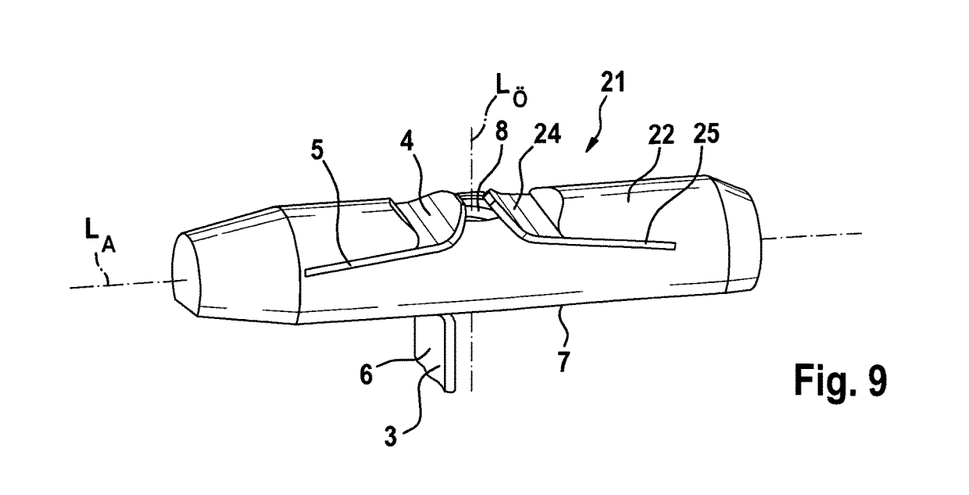
FIG. 9 is a perspective view of a second toggle fixing according to the invention.

The second toggle fixing 21 according to the invention shown in FIG. 9 differs from the first toggle fixing 1 according to the invention shown in FIGS. 1 to 7 only in that, in the region of the opening 8, there is arranged a further, second counterbearing element 24 which is of identical configuration to the first counterbearing element 4 but, in relation to the first counterbearing element 4, is mounted rotated through 180° with respect to the opening longitudinal axis $L_Ö$ on the crosspiece 22 in a second receptacle 25. By the use of two counterbearing elements 4, 24 it is possible for higher loads to be transmitted from a screw into the crosspiece 22 and/or for screws having a smaller diameter to be held in the opening 8.

Figure 10:
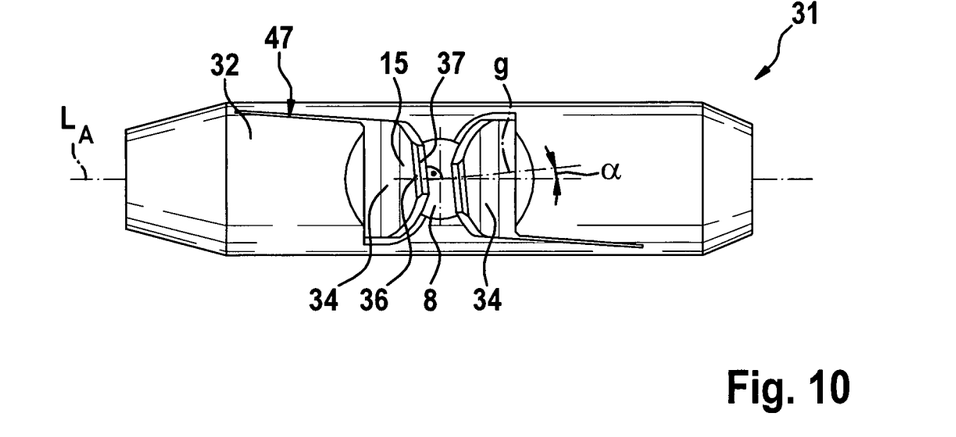
FIG. 10 is a plan view of a third toggle fixing according to the invention.
Figure 11:
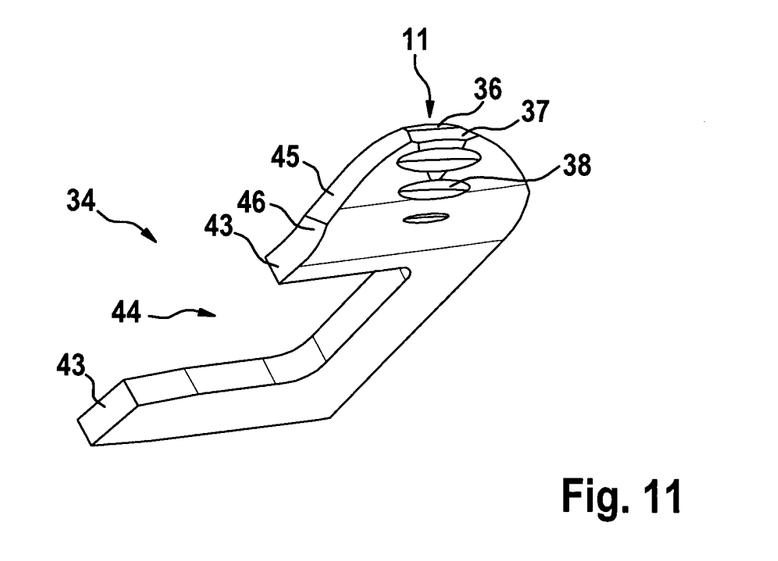
FIG. 11 is a perspective view of a counterbearing element of the toggle fixing of FIG. 10.

FIG. 10 shows a further toggle fixing 31 according to the invention which likewise has two counterbearing elements 34 in the region of the opening 8. A counterbearing element 34 is shown in FIG. 11. The toggle fixing 31 does not have an internal thread in the region of the opening 8. In order that the toggle fixing 31 can likewise be used with different screws 10a, 10b, the planar free end 11 has a chamfer 36, and accordingly the free end 11 has an end edge 37 of small height which is suitable for engagement in a metric external thread 20b of a screw 10b. The end edge 37 runs transversely with respect to the crosspiece longitudinal axis $L_A$, but substantially parallel with respect to the supporting side 7. "Transversely" means here that a straight line g running normally with respect to the end edge 37 forms an angle α of 7° with the longitudinal axis $L_A$ of the crosspiece 32. This makes it easier to screw a metric screw 10b into the region between the two counterbearing elements 34. In addition, on the sides of their engagement regions 45 facing towards the opening 8 the counterbearing elements 34 each have a thread element 38 which forms part of a turn of an internal thread in which the metric screw 10b is able to engage. As a result, the metric screw 10b finds good purchase in the toggle fixing 31.

The counterbearing element 34 shown in FIG. 11 has a laterally open, U-shaped slot 44 which separates two bearing limbs 43 from one another in the longitudinal direction. The bearing limbs 43 form the bearing region 42 which adjoins the engagement region 45 at the bending point 46. The counterbearing element 34 can be introduced into a laterally open receiving opening 47 transversely with respect to the longitudinal axis $L_A$.

LIST OF REFERENCE SYMBOLS 1, 21, 31 toggle fixing
2, 22, 32 crosspiece
3 strip
4, 24, 34 counterbearing element
5, 25, 35 receptacle
6 connection
7 supporting side
8 opening
9 internal thread
10a, 10b screw
11 free end of the counterbearing element 4, 24, 34
12, 42 bearing region
13, 43 bearing limb
14, 44 slot
15, 45 engagement region
16, 46 bending point
17, 47 receiving opening
18 reinforcing rib
19 wall
20a, 20b external thread of the screw 10a, 10b
36 chamfer
37 end edge
38 thread element
$A_W$ spacing of the free end 11 from the opening longitudinal axis $L_Ö$
$B_B$ width of the crosspiece 2, 22, 32
$D_A$ external diameter of the screw 10a
$D_K$ internal diameter of the opening 8
g straight line
$H_B$ height of the crosspiece 2, 22, 32
$H_W$ height of the counterbearing element 4, 24, 34
$L_A$ longitudinal axis of the crosspiece 2, 22, 32
$L_B$ length of the crosspiece 2, 22, 32
$L_Ö$ longitudinal axis of the opening 8
$R_Ö$ radius of the free cross-section of the opening 8

The invention claimed is:

1. A toggle fixing for fixing an article to a thin-walled building component, which has a crosspiece and a strip which is connected to the crosspiece and serves for holding the crosspiece during mounting, wherein the crosspiece extends along a crosspiece longitudinal axis and has on the side facing towards the strip a supporting side for contact with the building component, wherein the crosspiece has an opening for receiving a screw, wherein the opening has an internal diameter corresponding to a circular cylinder inscribed in the opening, the opening extending along an opening longitudinal axis transverse with respect to the crosspiece longitudinal axis, and wherein there is arranged on the crosspiece at least one counterbearing element having a spacing from the opening longitudinal axis that is less than half the internal diameter of the opening.

2. The toggle fixing according to claim 1, wherein the spacing of the counterbearing element from the opening longitudinal axis is at least 1.0 millimeter less than half the internal diameter of the opening.

3. The toggle fixing according to claim 1, wherein the counterbearing element is formed in such that, on insertion of a screw into the opening, it can be moved away from the opening longitudinal axis.

4. The toggle fixing according to claim 1, wherein the counterbearing element is in the form of a cantilever arm, the free end of which is directed away from the supporting side of the crosspiece.

5. The toggle fixing according to claim 1, wherein the counterbearing element has a bearing region and an engagement region, the engagement region being bent at an angle relative to the bearing region.

6. The toggle fixing according to claim 5, wherein the bearing region has two bearing limbs which are separated from one another by a slot.

7. The toggle fixing according to claim 1, wherein the counterbearing element has a thickness that is less than a width and a length, and is mounted in a receptacle of the crosspiece.

8. The toggle fixing according to claim 6, wherein the slot is U-shaped.

9. The toggle fixing according to claim 7, wherein the receptacle has two receiving openings for receiving the bearing limbs, the receiving openings being separated from one another by a reinforcing rib.

10. The toggle fixing according to claim 1, wherein the counterbearing element is made of metal and the crosspiece is made of plastics material.

11. The toggle fixing according to claim 1, wherein the opening has an internal thread which is implemented as a standard metric thread or as a UNC thread.

12. The toggle fixing according to claim 1, wherein the spacing of the counterbearing element from the opening longitudinal axis is at least 1.5 millimeters less than half the internal diameter of the opening.

13. The toggle fixing according to claim 1, wherein the spacing of the counterbearing element from the opening longitudinal axis is at least 2.0 millimeters less than half the internal diameter of the opening.

14. A toggle fixing for fixing an article to a thin-walled building component, which has a crosspiece and a strip which is connected to the crosspiece and serves for holding the crosspiece during mounting, wherein the crosspiece extends along a crosspiece longitudinal axis and has on the side facing towards the strip a supporting side for contact with the building component, wherein the crosspiece has an opening for receiving a screw, the opening extending along an opening longitudinal axis transverse with respect to the crosspiece longitudinal axis, and wherein there is arranged on the crosspiece at least one counterbearing element having a spacing from the opening longitudinal axis that is less than half the internal diameter of the opening, wherein the counterbearing element has a thickness that is less than a width and a length, and is mounted in a receptacle of the crosspiece.

15. A toggle fixing for fixing an article to a thin-walled building component, which has a crosspiece and a strip which is connected to the crosspiece and serves for holding the crosspiece during mounting, wherein the crosspiece extends along a crosspiece longitudinal axis and has on the side facing towards the strip a supporting side for contact with the building component, wherein the crosspiece has an opening for receiving a screw, the opening extending along an opening longitudinal axis transverse with respect to the crosspiece longitudinal axis, and wherein there is arranged on the crosspiece at least one counterbearing element having a spacing from the opening longitudinal axis that is less than half the internal diameter of the opening, wherein the counterbearing element is formed in such that, on insertion of a screw into the opening, it can be moved away from the opening longitudinal axis.

* * * * *